United States Patent
Bedetti

(10) Patent No.: US 10,166,517 B2
(45) Date of Patent: Jan. 1, 2019

(54) PROCESS AND APPARATUS FOR PRODUCTION OF A GRANULAR UREA PRODUCT

(75) Inventor: Gianfranco Bedetti, Lugano-Besso (CH)

(73) Assignee: Casale SA, Lugano (CH)

( * ) Notice: Subject to any disclaimer, the term of this patent is extended or adjusted under 35 U.S.C. 154(b) by 954 days.

(21) Appl. No.: 13/984,330

(22) PCT Filed: Feb. 28, 2012

(86) PCT No.: PCT/EP2012/053370
§ 371 (c)(1),
(2), (4) Date: Aug. 8, 2013

(87) PCT Pub. No.: WO2012/119891
PCT Pub. Date: Sep. 13, 2012

(65) Prior Publication Data
US 2013/0344239 A1 Dec. 26, 2013

(30) Foreign Application Priority Data
Mar. 10, 2011 (EP) .................... 11157702

(51) Int. Cl.
*C05C 9/00* (2006.01)
*B01J 2/16* (2006.01)

(52) U.S. Cl.
CPC .............. *B01J 2/16* (2013.01); *C05C 9/005* (2013.01)

(58) Field of Classification Search
None
See application file for complete search history.

(56) References Cited

U.S. PATENT DOCUMENTS

| 4,353,709 A | 10/1982 | Nioh et al. |
| 4,353,730 A | 10/1982 | Kinno et al. |

(Continued)

FOREIGN PATENT DOCUMENTS

| EP | 1136465 A2 | 9/2001 |
| EP | 2305371 A1 | 4/2011 |

(Continued)

OTHER PUBLICATIONS

International Search Report issued in connection with PCT/EP2012/053370.

(Continued)

*Primary Examiner* — Shamim Ahmed
*Assistant Examiner* — Bradford M Gates
(74) *Attorney, Agent, or Firm* — Akerman LLP

(57) ABSTRACT

A process for production of a granular urea product in a fluidized-bed where: small droplets (10) of fresh urea melt are contacted with a cooling medium to form solid particles, said solid particles (11) are contacted with droplets of urea melt (12) which are larger than said germ particles, the solid particles and said droplets forming together larger solid particles (13), and said solid particles further increasing their size step by step and upon contact with droplets of urea melt, until the solid particles reaches a given size, and said solid particles are then subject to a further growing process by contact with liquid droplets now smaller than the solid particles, until a desired size of the granular product is reached.

9 Claims, 1 Drawing Sheet

(56) References Cited

U.S. PATENT DOCUMENTS

| | | | |
|---|---|---|---|
| 4,749,595 A | 6/1988 | Honda et al. | |
| 5,653,781 A * | 8/1997 | Kayaert | B01J 2/16 71/28 |
| 2010/0285214 A1 | 11/2010 | Zardi | |

FOREIGN PATENT DOCUMENTS

| | | |
|---|---|---|
| WO | 91/12074 A1 | 8/1991 |
| WO | 2012/113473 A1 | 8/2012 |

OTHER PUBLICATIONS

International Preliminary Report on Patentability issued in connection with PCT/EP2012/053370.

* cited by examiner

PROCESS AND APPARATUS FOR PRODUCTION OF A GRANULAR UREA PRODUCT

This application is a national phase of PCT/EP2012/053370, filed Feb. 28, 2012, and claims priority to EP 11157702.9, filed Mar. 10, 2011, the entire contents of both of which are hereby incorporated by reference.

FIELD OF THE INVENTION

The present invention relates to a process and apparatus for production of a granular urea product.

PRIOR ART

A prior art process for obtaining granular urea product is based substantially on the progressive growth of granules maintained in a fluidized-bed state. Urea melt is sprayed or atomized over the fluidized bed and deposition and solidification of the urea melt on the seeds and granules causes the progressive formation of the desired granular product.

The process takes place by droplets of the growth liquid wetting, sticking and solidifying on the seeds and granules which, together, form the fluid bed. The basic concept of the known process is that small droplets of liquid urea melt are contacted with a relatively large solid particles, so that the liquid droplet form a thin liquid layer around the solid particle, or at least a portion thereof, and said layer undergoes evaporation and solidification.

U.S. Pat. No. 4,353,730 for example discloses a prior-art process and apparatus for granulation.

The starting points of the process are solid particles at least 0.5 to 1.5 mm of diameter usually called seeds. The seeds can be generated with two techniques. A first technique is to screen the granular product and to use undersize and/or oversize granules to provide the seeds. Undersize granules can be used as such while oversize granules are crushed to produce seed material. Disadvantages of this technique are non-uniform size and shape of the seed material, and the need to recirculate a relevant amount of the flow rate of the fluidized bed, such as 50%. Moreover, recycling some final product as seed material has the consequence that additives added during the granulation process are also contained in the seed material. As a consequence the concentration of additive in the granular product may deviate from the desired amount.

Another technique is to produce seeds in a separate equipment by solidification of a small amount of the fresh urea melt. The seed generator usually comprises a cooled conveyor belt where drops of urea melt are deposited and solidify forming pastilles or lentilles with about 1.5 mm diameter. The seed material has a uniform size and composition, however the machine is large (about 10 m long) and expensive. Moreover the formation of pastilles needs urea melt with a high degree of purity (>99.8%) and usually demands for an evaporator in order to bring urea melt from 96% to over 99.8% purity, which is an additional cost.

SUMMARY OF THE INVENTION

The invention is aimed to overcome the above drawbacks concerned with the need of a seed material for the fluidized-bed granulation of urea.

The invention is a novel process for production of a granular urea product where solid particles for starting the granulation are produced internally in the process itself, which is only fed with liquid. This step is called germination and consists in small droplets of the urea melt being solidified by contact with a cooling medium, to form small solid particles. Said small solid particles start to grow upon contact with other droplets of liquid urea melt, which are bigger than said particles. In this stage of the process, a solid particle hit by a liquid droplet can be enveloped in the droplet and subsequent solidification causes the formation of a larger solid particle. Hence the solid particles become larger and larger with a step-by-step process until they reach a size that is comparable to that of prior-art seeds and is sufficient to start a conventional process of granulation.

Hence, an aspect of the invention is a process where:
a) first and small droplets of fresh urea melt are contacted with a cooling medium to form solid starting particles,
b) said starting particles are contacted with droplets of urea melt larger than said starting particles, said particles and said droplets forming together larger solid particles, the solid particles increasing their size step-by-step upon contact with droplets of urea melt larger than the particles, until the solid particles reach a given size, and
c) the so obtained solid particles are then subject to a further growing process in a fluidized-bed and by contact with liquid droplets now smaller than the solid particles, until a granular product with a desired size of the granules is formed.

The step c) is carried out in a fluidized-bed state. The previous steps a) and b) may also be carried out in a fluidized bed state although not essential.

Preferably the fluidizing medium is air which also acts as a cooling medium. The melt and the cooling air are fed in a controlled manner in order to support the above process steps and to maintain the status of fluidized bed at least in the stage c) of the process. In particular, the flow rate and speed of air is controlled in order to keep fluidization, taking into account the increasing mass of the particles.

The average size of the small droplets used for formation of the starting particles is preferably equal to or less than 200 µm (0.2 mm) and more preferably about 50-200 µm (0.05-0.2 mm). Hence also the size of the solid starting particles is preferably in the same range of 50-200 µm. The larger droplets fed in stage b) of the process may have a size in a range 200 µm to 1 mm and preferably 200 µm to 500 µm. In a preferred embodiment the stage b) is fed with several inputs of droplets with increasing size.

The size of solid particles obtained after step b) enables to start a conventional growth process by deposition of liquid droplets on the surface of solid particles. Said size after step b) is for example around 0.5 mm and preferably in the range 0.5 to 1 mm. The size of the solid particles shall be intended as diameter of spherical particles or equivalent diameter. The invention may obtain solid particles which are spherical or quasi-spherical.

The stages a) and b) of the above disclosed process can be seen as an internal germination. The solid particles delivered at the end of stage b) can be named "germs" of the granulation process. The last step c) is substantially similar to a conventional process where growing is based on deposition of liquid melt on solid granules; the invention however provides that no external input of a solid seed material is necessary because the granulation starts around the solid germs delivered by the previous germination.

It shall be noted that the prior art processes introduce solid granules (seeds) in the fluidized bed. These seeds need to be large enough to allow the solidification of the droplets of urea melt on their surface. The invention adopts a different approach where no solid material is fed to the fluidized bed and the granulation starts with the formation of the above disclosed germs from liquid droplets of urea melt.

The process steps a) to c) can be executed as a function of time in the same environment, or in different portion or stages of a container.

The steps a) to c) can be carried out in the same apparatus, for example in the same granulator. In some embodiments the germination of first steps a) and b) is carried out in a dedicated front-end portion of a granulator.

In one embodiment of the invention the process is carried out continuously in a longitudinal fluidized bed, preferably a double-vortex longitudinal fluidized bed as described in WO 2009/086903. The first steps a) and b) are carried out in a first part of the longitudinal fluidized bed and the conventional growth according to step c) is carried out in a second remaining part of the same fluidized bed. Said first part and second part of the fluidized bed can be separated by a baffle, although a physical means of separation is not necessary.

According to another embodiment, the germ particles are generated in a first container and the subsequent conventional granulation is carried out in a second container which is separate from said first container.

The granular product obtained with the invention may have any size, e.g. 2 to 8 mm.

The advantages of the invention include:
almost perfect spherical seed material with same composition of the fresh melt;
no need of large and expensive equipments such as cooled belt conveyor for delivering of pastilles,
no need of evaporators to enhance the purity of the urea melt, the process can operate with a 95%-96% purity,
little urea melt required by the germination stage and small size of the apparatus for germination, compared to known machines for producing seeds or pastilles of urea.

An aspect of the invention is also an equipment for carrying out the above process. An equipment according to the invention comprises:
a first environment;
means adapted to feed at least a first flow of small droplets of fresh urea melt and cooling air to said first environment, to cause the formation of solid starting particles,
means to feed at least a second flow, and preferably a plurality of flows, of larger droplets of urea melt to said first environment, the droplets of said second flow or flows being larger than droplets of said first flow,
a second environment in communication with the first environment and means for feeding particles formed in the first environment and droplets of urea and fluidizing air to said second environment for granulation of said solid particles under a fluidized-bed state.

The first and second environment could be separate containers or parts of a single container. Said first flow of droplets is preferably produced with nozzles adapted to deliver droplets with a diameter equal to or less than 200 μm and more preferably in a range of 50 to 200 μm diameter. In a preferred embodiment, the first container or first part of a single container has at least a first set of nozzles adapted to deliver droplets of 50 to 200 μm and at least a second set of nozzles adapted to deliver larger droplets of the urea melt. More preferably, the second set of nozzles comprises several sub-sets of nozzles and each sub-set is adapted to deliver droplets of a different size, e.g. from 200 to 500 μm. Said sub-sets of nozzles may be distributed over the container or part of container of the first environment, from smaller ones to larger ones.

The features and the advantages of the invention will now be elucidated with reference to preferred and non limiting embodiments.

DETAILED DESCRIPTION OF A PREFERRED EMBODIMENT

Figure 1:
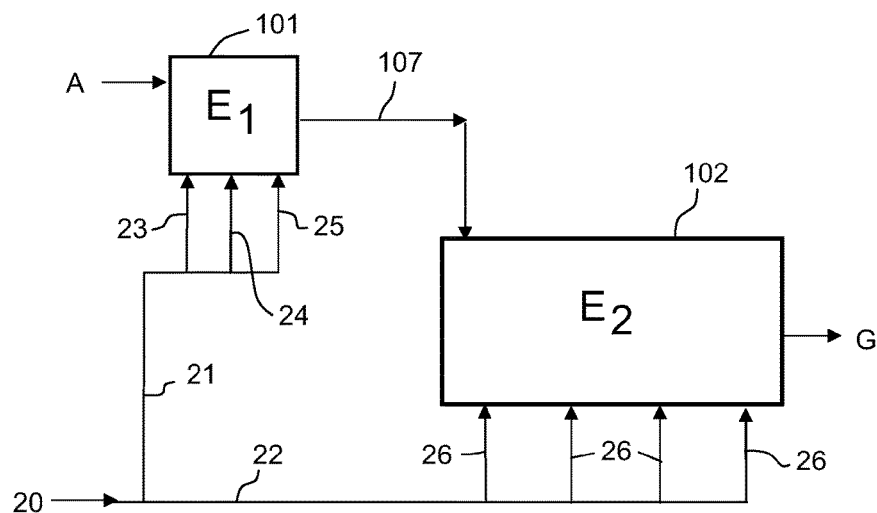
FIG. 1 is a scheme of an embodiment of an apparatus adapted to carry out the invention.

FIG. 1 show a first embodiment including a container 102 for a fluidized-bed granulation (granulator) and a separate container 101 connected to said container 101 via line 107. Said containers define environments $E_1$, $E_2$ respectively.

The container 102 hosts a fluidized-bed with a mono- or double-vortex operation mode. Under operation, the fluidized bed has a continuous flow or fluid vein in the longitudinal direction, and two transversal vortex having opposite sense of rotation and an axis parallel to said longitudinal direction.

The container 101 operates as germinator in accordance with the invention. The germinator receives a portion 21 of the urea melt 20 and a flow of cooling air A. Spraying or atomizing nozzles are distributed along the container 101. In the figure, each of line arrows 23, 24 and 25 denotes a set of spraying or atomizing nozzles. Nozzles 23 are able to deliver very fine drops of urea melt preferably having a size of about 100 or 200 μm. Said fine droplets are solidified with the help of the cooling air A, forming small solid granules in a first region of the environment $E_1$. The next nozzles denoted with arrows 24 and 25 deliver larger droplets, for example of 300 and 400 μm diameter.

The first and smaller granules are then hit by said larger drops and increase their size step-by-step in a further region inside said environment $E_1$. The so obtained solid granules are sent to the granulator 102 via line 107; the rest 22 of the urea melt is sprayed (arrows 26) into the environment $E_2$ where a fluidized bed is maintained.

The nozzles of the container 101 are arranged from smaller nozzles delivering the very fine starting droplets, to larger nozzles delivering larger droplets. Preferably the size of the input droplets regularly increases from input side to output side of the environment $E_1$.

Figure 2:
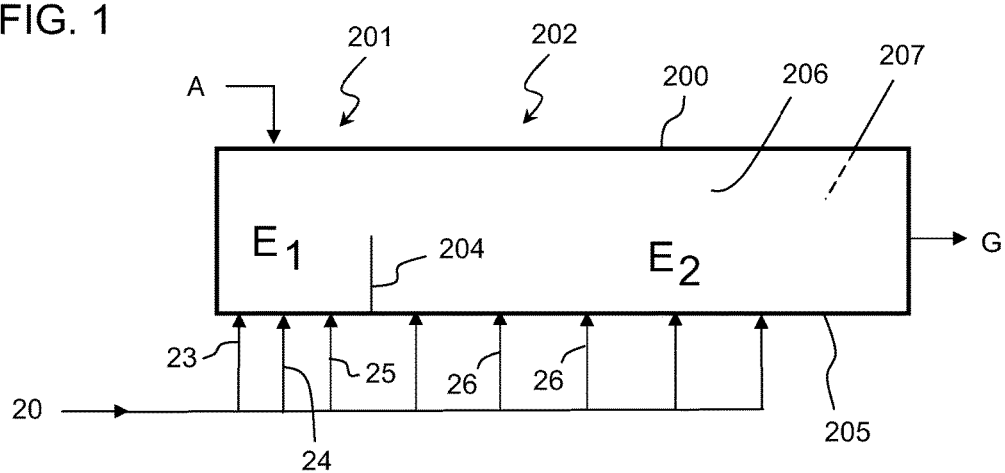
FIG. 2 is a scheme of an alternative embodiment for the apparatus.

FIG. 2 illustrates an embodiment where the environments $E_1$ and $E_2$ for germination and granulation are delimited by parts 201 and 202 of the same container 200. In other words a germinator is integrated in a longitudinal, fluidized-bed granulator. Said parts 201, 202 of the container are separated by a baffle 204 which however is not essential.

A fluidized-bed state is maintained in the container 200 at least in the portion 202 for example with fluidization air entering a perforated bottom wall 205. Urea melt can be sprayed with nozzles located on the front/rear side walls 206, 207.

Operation is similar to embodiment of FIG. 1. Fine droplets of urea melt are solidified with the help of the cooling air A, forming small solid particles in the environment $E_1$ which are the starting particles of the whole process. Said particles start to increase their size while contacting larger droplets of urea melt fed for example with the inputs 24, 25.

The germinator portion 201 may be divided into further sub-portions eventually by internal baffles, to separate zones of portion 201 according to average size of the urea particles.

In some embodiments the air input is modulated in such a way to maintain a fluidized-bed state also in the portion 201.

At the end of the germinator portion 201, namely close to baffle 204 if provided, or at the output of the germinator 101 the solid granules have reached a size (e.g. about 0.5 to 1 mm) which is sufficient to allow a conventional granulation process. The conventional process is a process where granules gain size by deposition of liquid droplets smaller than granules and forming a liquid layer over the surface of the granules. Said conventional granulation process is made in granulator 102 or part 202 of the container 200.

Figure 3:
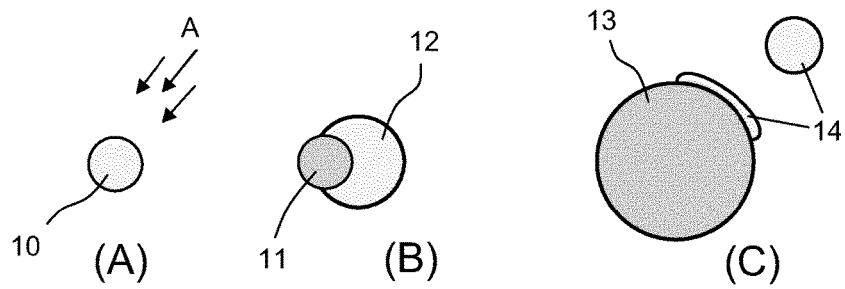
FIG. 3 is a sketch of the process according to the invention.

The process is schematized in FIG. 3. FIG. 3(A) shows a tiny droplet 10 of urea melt which is contacted with cooling and fluidizing air A in the environment $E_1$ of FIG. 1 or 2. The liquid droplet 10 is readily solidified by the cooling air and forms a solid spherical particle 11. The particle 11 is contacted with liquid droplets 12 for example from input lines 24, 25. The size of said droplets 12 is small, but greater than that of the starting tiny droplet 10 and then greater than size of the solid particle 11. The solid particles 11 acts as starting point for solidification of the droplets 12. In particular, a solid particle 11 is typically enveloped in a droplet 12 as shown in FIG. 3(B); solidification of the liquid fraction around the particle 11 by the cooling air A causes the formation of a larger spherical or quasi-spherical particle.

This process depicted in FIG. 3(B) continues step-by-step until the solid particle reaches a size which is sufficient for the particle to enable a conventional growth process, typically at least 0.5 mm. At this stage, the particle passes into the environment $E_2$. The conventional growth process is depicted in FIG. 3(C) where a liquid droplet 14, now smaller than the solid particle 13, impacts the solid particle 13. The size of the droplet 14 may be the same or different than the size of particles 12 contacted with the small particles 11 in the previous step.

The invention claimed is:

1. A process for production of a granular urea product comprising the steps of:
   a) contacting droplets of fresh urea melt with a cooling medium to form solid starting particles,
   b) contacting said solid starting particles with droplets of urea melt which are larger than said solid starting particles, the solid starting particles and said droplets forming together larger solid particles, and said larger solid particles further increasing their size step-by-step upon contact with larger droplets of urea melt, until the solid particles reach a given size, and
   c) subjecting said solid particles to a further growing process by contact with liquid droplets now smaller than the solid particles, until a desired size of the granular product is reached;
   wherein said droplets which form the starting particles have an average size equal to or less than 200 μm (0.2 mm).

2. The process according to claim 1, said droplets which form the starting particles having an average size in a range 50-200 μm (0.05-0.2 mm).

3. The process according to claim 2, the solid particles obtained after step b) having an average size of around 0.5 mm.

4. The process according to claim 2, the solid particles obtained after step b) having an average size in the range 0.5 to 1 mm.

5. The process according to claim 1, a fluidized-bed state being maintained at least in the stage c) of the process with air which also acts as the cooling medium.

6. The process according to claim 5, the fluidized-bed in the stage c) being a longitudinal fluidized bed with a main flow direction and a double-vortex arrangement with two vortex formed in the fluidized bed having opposite sense of rotation around axes substantially parallel to said main flow direction.

7. Equipment for carrying out a process according to claim 1, comprising at least:
   a first environment;
   means adapted to feed at least a first flow of droplets of fresh urea melt and cooling air to said first environment, to cause the formation of solid starting particles,
   means to feed at least a second flow of larger droplets of urea melt to said first environment, the droplets of said second flow being larger than droplets of said first flow,
   a second environment in communication with the first environment and means for feeding particles formed in the first environment and droplets of urea and fluidizing air to said second environment for granulation of said solid particles under a fluidized-bed state;
   wherein the means feeding said first flow of droplets being adapted to deliver droplets with a diameter equal to or less than 200 μm.

8. The equipment according to claim 7, comprising separate containers delimiting said first environment and second environment, or a single container comprising portions delimiting said first environment and second environment.

9. The equipment according to claim 7, wherein said means to feed at least a second flow comprises a plurality of flows of larger droplets of urea melt to said first environment.

* * * * *